United States Patent [19]

Silva et al.

[11] Patent Number: 4,994,952

[45] Date of Patent: * Feb. 19, 1991

[54] LOW-NOISE SWITCHING POWER SUPPLY HAVING VARIABLE RELUCTANCE TRANSFORMER

[75] Inventors: Donald M. Silva, West Lafayette; LeRoy F. Silva, Lafayette; Fred M. Fehsenfeld, Sr., Indianapolis, all of Ind.

[73] Assignee: Electronics Research Group, Inc., West Lafayette, Ind.

[ * ] Notice: The portion of the term of this patent subsequent to Oct. 24, 2006 has been disclaimed.

[21] Appl. No.: 410,142

[22] Filed: Sep. 20, 1989

Related U.S. Application Data

[63] Continuation-in-part of Ser. No. 154,863, Feb. 10, 1988, Pat. No. 4,876,638.

[51] Int. Cl.$^5$ ............... H02M 7/538; H02M 3/337
[52] U.S. Cl. ........................... 363/56; 336/73; 363/97
[58] Field of Search ............. 363/17, 25, 26, 90, 363/95, 97, 98; 323/247, 249, 250, 254, 331, 335; 336/73

[56] References Cited

U.S. PATENT DOCUMENTS

| | | | |
|---|---|---|---|
| 3,660,749 | 5/1972 | Kadri | 363/23 |
| 4,177,418 | 12/1979 | Brueckner et al. | 323/250 |
| 4,327,348 | 4/1982 | Hirayama | 323/250 |
| 4,342,075 | 7/1982 | Hiromitsu | 363/23 |
| 4,616,301 | 10/1986 | Small | 363/26 |
| 4,737,704 | 4/1988 | Kalinnikov et al. | 323/331 |
| 4,782,437 | 11/1988 | Nishiyama et al. | 363/97 |
| 4,858,093 | 8/1989 | Sturgeon | 363/20 |

FOREIGN PATENT DOCUMENTS

| | | | |
|---|---|---|---|
| 267943 | 12/1913 | Fed. Rep. of Germany | 323/331 |
| 1939278 | 2/1979 | Fed. Rep. of Germany | 363/134 |
| 3125241 | 4/1982 | Fed. Rep. of Germany | 363/25 |
| 124224 | 9/1979 | Japan | 336/73 |

Primary Examiner—William H. Beha, Jr.
Attorney, Agent, or Firm—Frost & Jacobs

[57] ABSTRACT

There is provided a low-noise switching power supply for producing a regulated output voltage from an unregulated supply. The power supply includes a main transformer having first, second and third legs. A primary winding associated with a first leg produces an alternating magnetic flux in the core. A load winding associated with a second leg produces the output voltage from the power supply. A control winding is associated with the third leg. The regulated output voltage is compared to a reference voltage and used to operate a control circuit which alternately short circuits the control winding so as to vary the reluctance pass in the transformer and maintain the output voltage at a substantially constant predetermined value. A feedback circuit including a coupling transformer connects the primary coil to the switching circuit to improve regulation and provide a "soft start" capability.

A second embodiment of the present invention utilizes a constant frequency source to drive the main switching transistors of the unregulated power supply instead of the self oscillating scheme.

11 Claims, 11 Drawing Sheets

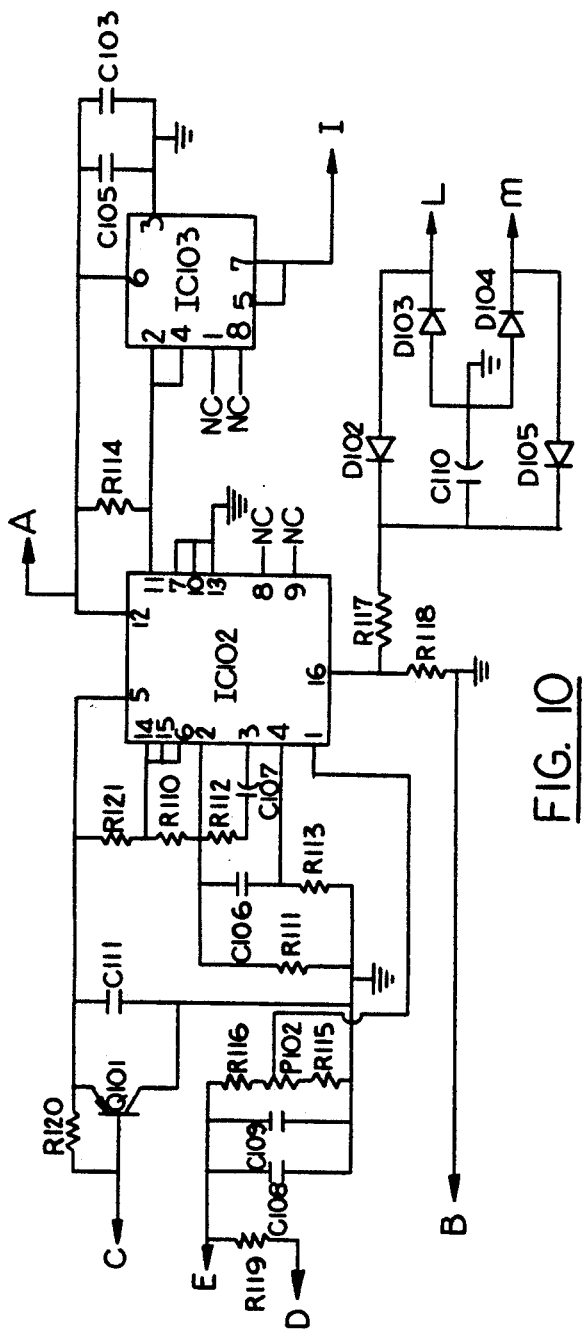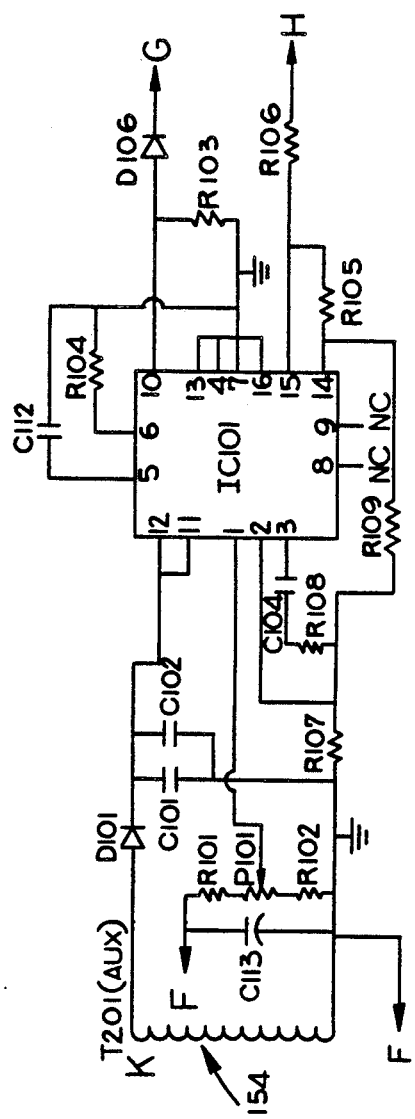
FIG. 10
FIG. 12

1

LOW-NOISE SWITCHING POWER SUPPLY HAVING VARIABLE RELUCTANCE TRANSFORMER

CROSS-REFERENCE TO RELATED APPLICATION

This application is a Continuation-In-Part Application of U.S. Ser. No. 07/154,863 Filed Feb. 10, 1988, now U.S. Pat. No. 4,876,638.

BACKGROUND OF THE INVENTION

1. Field of the Invention

The present invention relates generally to control of direct current power to electronic loads, and more particularly to a fully regulated, all electronic switching DC power supply having excellent regulation and low noise.

2. Description of Related Art

The field of electronic power supplies, and in particular electronic switching DC power supplies, has been closely studied for many years and is extremely well developed. As is well known, the primary source of power in such circuits may be from the alternating current power lines (e.g. 120 v, 60 Hz), or from another source of direct current power that is either unregulated or at a voltage level not suitable for the electronic load being supplied. It is a usual requirement of such electronic loads that the voltage supplied be regulated to a fraction of a percent over a wide range of load currents, supply voltages, and operating temperatures. As used herein "unregulated" means the voltage, generally from one of the sources of supply just described, which is to be used as the supply source for the power supply of the present invention.

Generally, regulated power supplies are of two basic types: linear power supplies and switching power supplies (usually called switchers). The linear power supplies are capable of high quality regulating performance, but suffer from relatively low overall efficiency since they regulate the output voltage by deliberately dissipating power in an electronic regulating circuit.

Common methods for providing extra regulation for outputs in linear power supplies which do not have direct feedback to the source are a linear series pass regulator or a switching buck regulator. Examples of these regulators are found in Section 9 of "Linear/- Switchmode Voltage Regulated Handbook," Motorola Incorporated (1982 Edition) and "TMOS Power FET Design Ideas," Motorola Incorporated (Issue A, 1985 Edition). These types of circuits involve the use of a regulating element, which is usually a transistor. Since the output current flows through the regulating element, a substantial amount of power is thereby dissipated. The regulating elements in the associated heat sink must therefore be of sufficient size and durability to withstand the environment. While these types of regulators are functional, they are undesirable because of the size and cost of the components required and the power wasted in the form of heat.

Switching power supplies usually regulate the output voltage by controlling the duty cycle of the switching transistors that produce an alternating (square wave) voltage at the primary of the main transformer. The transformer, through its normal transformer action, steps the primary voltage up or down to the desired level compatible with the load circuit. Switching power supplies have higher efficiencies than linear power supplies because the transistors that drive the primary winding of the main transformer are either saturated or cut-off. This minimizes the power that is dissipated in these elements since no current flows through the transistors when the voltage is at its maximum value across the transistors, and the maximum current flows through the transistors when the voltage is a minimum (the saturation value) across the transistors. By controlling the duty cycle of the switching transistors, the average value of the transformed voltage can be varied, thus exerting control over the output voltage (and consequently the load voltage) in response to feedback regulating signals from the load.

A circuit for regulation of a DC output voltage in a switching power supply is shown in U.S. Pat. No. 4,375,077, which issued to J. Williams on Feb. 22, 1983. This circuit contains a control transformer having primary, secondary and control windings The output of the circuit is connected from the primary and secondary windings and is controlled by a switching element connected from the control winding The voltage output error is provided to the duty cycle modulation circuitry, which varies the duty cycle of the switching element and thereby controls the output voltage level.

Most commercial switching power supplies, as seen in the Williams reference, use a driven type of circuit in which the switching transistor(s) is driven from a completely separate circuit. In addition, these power supplies do not utilize any feedback signals from the main transformer. The duty cycle or pulse width modulation circuitry operates on this separate circuit to provide the required regulating action. An undesired by-product of this pulse width modulation scheme, however, is the production of high frequency noise signals as a result of the narrow, high current pulses induced in the transformer by the switching transistors. Because the main transformer is connected either directly or indirectly to the source of line power, these noise pulses will be carried to the line (or load) if special and expensive filtering techniques are not employed.

Another class of power supplies utilize a current limiting transformer to provide a high voltage that fires a spark gap for igniting liquid or gaseous fuels. The high voltage is required to ionize and break down the spark gap and the current limiting feature limits the current that flows through the gap, which has a relatively low voltage across it once the spark has been formed.

For example, a current limiting power supply for electron discharge lamps which utilizes a transformer like that described above is found in U.S. Pat. No. 4,414,491, which issued to W. Elliott on Nov. 8, 1983. In this arrangement, the power supply includes a high frequency inverter circuit coupled to an electron discharge lamp load through a special purpose transformer. The transformer is wound on a saturable ferro-magnetic core structure forming a first magnetic flux path coupling the primary and secondary windings of the transformer and a second shunt magnetic path including an air gap which carries an increasing share of flux as load current increases. The switching of the inverter circuit occurs in response to the partial saturation of the core. Auxiliary windings may be serially connected with the primary winding of the transformer and wound about the shunt magnetic path to enhance the current regulating properties of the supply.

In a similar type of arrangement, U.S. Pat. No. 4,562,382, which issued to W. Elliott on Dec. 31, 1985, illustrates a solid-state inverter which utilizes a multiple core transformer. The multiple core transformer includes a high-permeability saturable core upon which both the primary and secondary windings are wound, and one or more lower permeability non-saturating cores upon which the primary and/or secondary windings are wound to provide additional self-inductance. The inverter switching transistors drive the two halves of the transformer's center-tapped primary winding on alternate half-cycles under the control feedback winding which is wound on the saturable core. A non-saturating core about which the primary winding is wound, and a capacitor connected in parallel with both halves of the primary winding, protects the switching transistors against transients, prevents the saturating core from going into hard saturation, and efficiently transfers energy stored in a leakage inductance of the primary windings from half-cycle to half-cycle. The multicore transformer is assembled by means of bobbin wound primary and secondary windings through which the center leg of ferrite E-core shapes may be inserted to provide the desired saturating and non-saturating flux paths.

SUMMARY OF THE INVENTION

As will be explained in more detail hereinafter, the present invention avoids these problems of prior art power supply circuits by eliminating pulse width modulation of the control current in the switching transistors. In a preferred embodiment of the present invention, the power supply comprises a transformer including a transformer core with first, second and third core legs. The third core leg may be provided with an air gap. The transformer is also provided with a set of transformer windings including a control winding associated with the first core leg, a primary winding associated with the second core leg, and a load winding associated with the third core leg for producing the regulated output voltage from the power supply.

The power supply of the present invention is also provided with control circuitry for controlling and regulating the output voltage. In the preferred embodiment, this control circuitry includes switching means comprising switching transistors which utilize the unregulated supply voltage to provide an oscillating voltage to the primary winding of the transformer. A comparison circuit monitors the actual output voltage at the load winding and compares it with a reference representative of the desired output voltage value to produce an error signal representative of the difference between the actual output voltage and the reference. The error signal is applied to a switching circuit which short circuits the control winding as required to maintain the output voltage at the desired value.

Consequently, in the present invention, an alternating magnetic flux is established in the core, and is modulated by varying the reluctance of a portion of the transformer core so as to maintain the output voltage at a substantially constant predetermined value.

Consequently, in the present invention, it is not necessary to modulate the control current in the switching transistors, which often leads to large switched currents and inherently induced noise. Instead, the magnetic flux is switched in and out of the load coil that is on one of the legs of the main transformer and the pulse width of the main switching currents is left undisturbed. In this way, a source of noise production, as well as the subsequent need for noise filtering, is eliminated. Pulse width modulation is utilized in the control winding and its driving circuitry in the present invention, but the leakage reactance of the main transformer effectively isolates the noise pulses from the power source and the load. The three-legged main transformer, with the control coil, primary coil, and load coil on separate legs, has a naturally high leakage reactance. This offers several operating advantages, including resistance to overload, inherent noise filtering, and spike suppression. The regulating circuitry removes all of the disadvantages (such as poor load regulation) that a high leakage reactance structure would induce.

The present invention also employs a self-oscillating circuit that utilizes feedback from the main transformer (through a separate transformer circuit) in developing the driving signals for the switching transistors. As a result, desirable "soft start" action occurs, as well as reliable circuit operation over a wide range of line, load, and environmental conditions. Conventional switching power supplies, in contrast, use regulating schemes that are incompatible with self-oscillating switching circuits.

In addition to the foregoing advantages, since the switching power supply of the present invention is operated at frequencies considerably in excess of the 60 Hz line frequency, usually over 20 kHz, the transformers, filter chokes, and filter capacitors may be made smaller in size, resulting in significant savings in size and weight. Additionally, the present invention, with its special main transformer having a built-in high leakage reactance structure, provides naturally occurring energy storage features that inhibit switching transients. Therefore, the demands on the switching transistors with respect to voltage spikes are minimized.

The present invention permits a high efficiency switching power supply with a relatively low component count as compared to conventional switching power supplies. It uses low cost components, and has the capability of close line and load regulation performance. The self-oscillating design yields superior soft start action and operation over a wide range of input voltages.

A second embodiment of the present invention utilizes a constant frequency source to drive the main switching transistors of an unregulated power supply instead of the self oscillating scheme utilized in the first embodiment. Rather than concentrating on circuit simplicity, the emphasis in this second embodiment is on constant frequency operation of the supply and its corresponding advantages. Further, a 12 volt output is added to the 5 volt output of the first embodiment for greater flexibility.

The basic control system of the second embodiment, including the design of the main non-saturating transformer utilized (not incorporating an air gap in any leg thereof), is the same as in the first embodiment. That is, the control winding of the main transformer is shorted in response to feedback signals from the regulated output of the switching power supply. However, the switching transistors which drive the main transformer are not duty-cycle modulated as in the first embodiment. Instead, the short circuit is applied to the control winding when both switching transistors are turned off. This reduces the stress on both the switching transistors and the diodes in the control winding. While this embodiment is more complex than the first embodiment, the stress reduction on the switching components increases reliability and allows less expensive components to be used.

BRIEF DESCRIPTION OF THE DRAWING

While the specification concludes with claims particularly pointing out and distinctly claiming the present invention, it is believed the same will be better understood from the following description taken in conjunction with the accompanying drawings in which:

FIG. 10 is a schematic block diagram depicting the 5 volt compare and control circuit of the second embodiment of the present invention for regulating the 5 volt output voltage connected to the external load;

FIG. 12 is a schematic block diagram depicting the 12 volt compare and control circuit of the second embodiment of the present invention for regulating the 12 volt output voltage connected to the external load;

DESCRIPTION OF THE PREFERRED EMBODIMENTS

Figure 1:
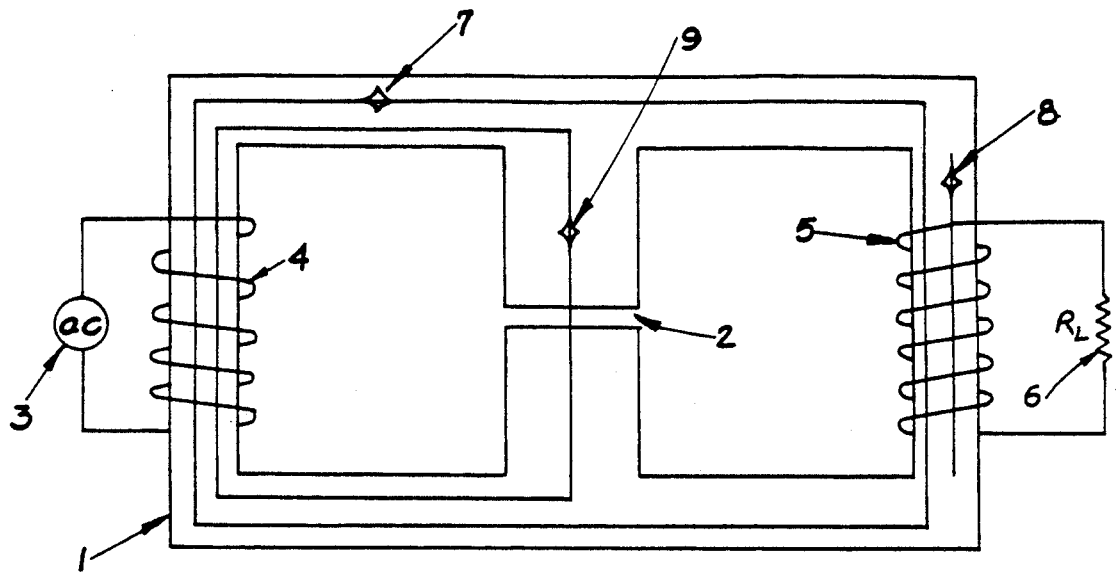
FIG. 1 is a schematic diagram depicting a typical air gap transformer.

As will be explained in more detail hereinafter, the switching power supply of the present invention utilizes a current limiting transformer in association with other elements to regulate the output load voltage. A typical current limiting transformer is shown in FIG. 1. Transformer core 1 has three legs, one of which may have an air gap 2 in series with the magnetic path. At the option of the designer, the air gap 2 may be set to a value which is suitable for a given condition of operation, including zero. A source of alternating voltage 3 is connected to primary winding 4, which is located on one of the legs on the transformer that does not have an air gap. Another coil 5 is located on the other leg of the transformer without an air gap and is connected to load resistance 6.

Under conditions of relatively light load, the reluctance of the magnetic path traversed by magnetic flux 7 is lower than the path through the leg with air gap 2 since the reluctance of air gap 2 is significantly greater than that of the iron in the rest of the magnetic path. Therefore, most of the flux linking primary coil 4 links secondary coil 5, making the voltage induced in coil 5 approximately equal to primary voltage 3 multiplied by the turns ratio between coils 5 and 4.

If a relatively low load resistance is placed across coil 5, current will flow through coil 5 and load 6. The flow of this current produces counter-flux 8 which opposes flux 7. If a short circuit is placed across load coil 5, then the net flux through coil 5 will be approximately zero. In that case, the flux linking coil 4 will then be diverted through the leg of the transformer containing air gap 2, which is labeled as flux 9. However, sufficient net flux will be left linking coil 5 to maintain the short circuit current in load 6, which is much smaller than the current would be if the leg containing air gap 2 were not present.

Figure 2:
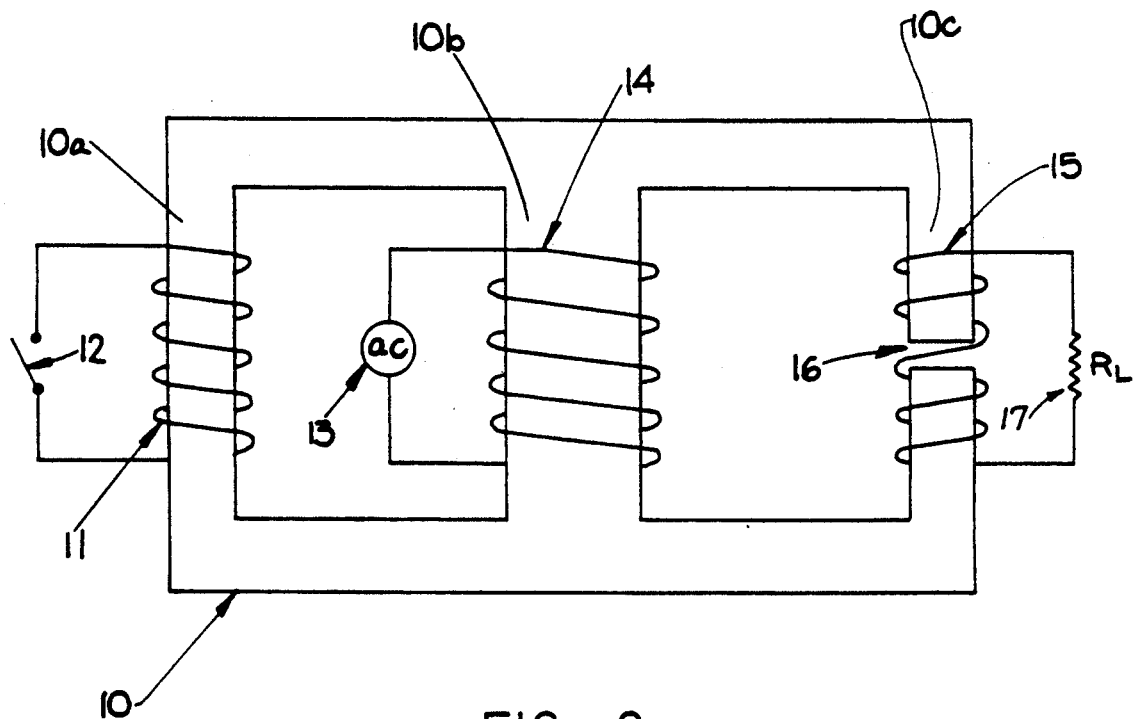
FIG. 2 is a schematic drawing depicting a variation of the current limiting transformer of FIG. 1, made in accordance with the present invention.
Figure 4:
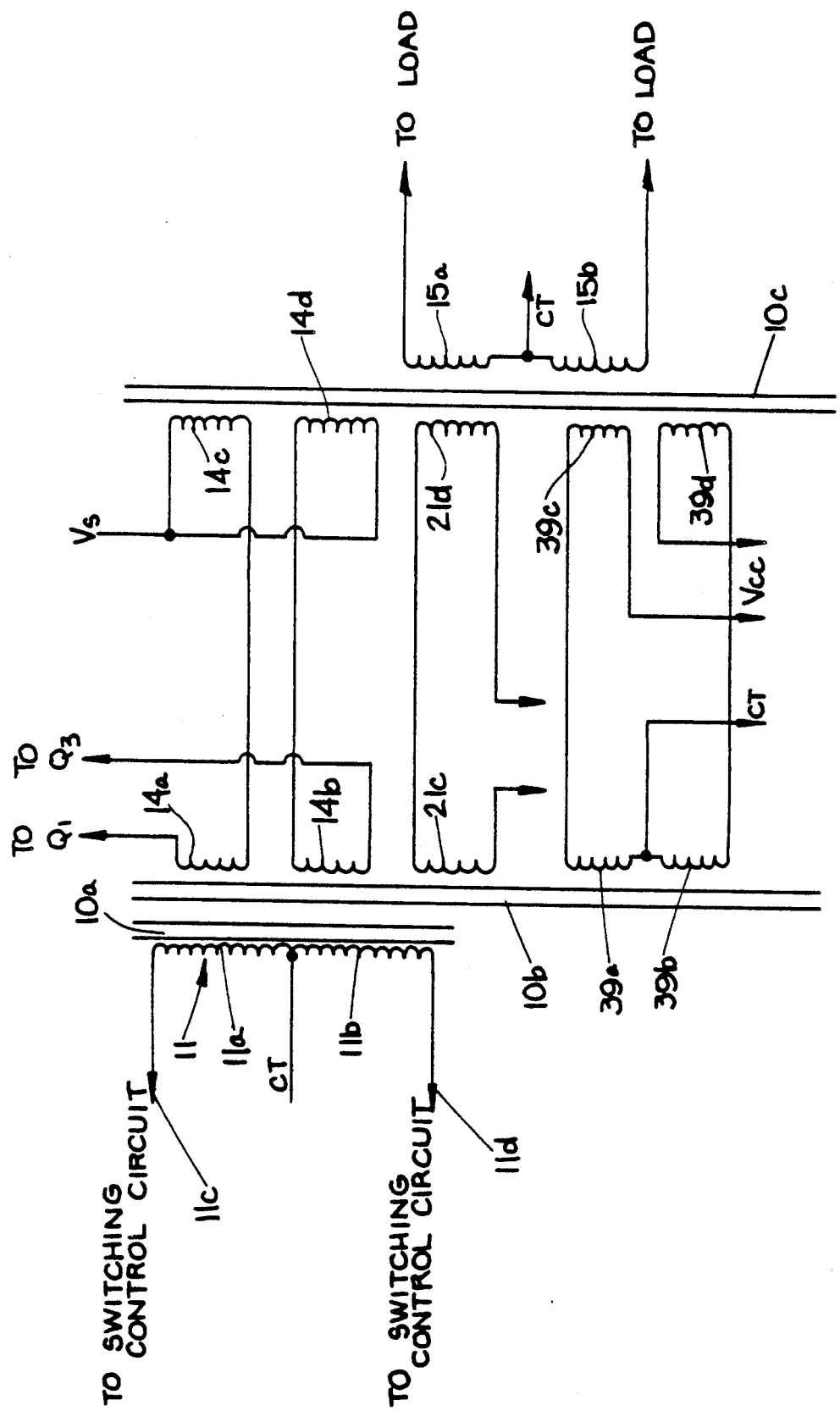
FIG. 4 illustrates the winding arrangement used with the transformer of FIG. 3.

A variation of the general structure of FIG. 1, as actually used in the preferred embodiments of the present invention, is shown in FIG. 2. In this arrangement, transformer core 10 is of the three-legged type, having legs 10a, 10b and 10c. One of the legs may contain an air gap 16 similar to the structure of FIG. 1 if desired. Control coil 11 Comprising winding portions 11a and 11b, together with center tap CT (as shown in FIG. 4), is located one of the legs 10a and is connected to schematically designated switch 12, which can be used to short circuit control coil 11. As used herein, "short circuit" means connecting together terminals 11c and 11d of control winding 11 (shown in FIG. 4) so as to reduce the impedance of the winding to a very low value. A source of alternating voltage 13 is connected to primary coil 14, which is installed on another leg 10b of the transformer. Load coil 16 is installed on leg 10c of the transformer and is connected to load 17, which for purposes of illustration is shown as a resistance $R_L$. If included, it will be understood that the length of air gap 16 may be set to determine the particular control characteristics of the circuit.

The action of the circuit in FIG. 2 resembles that of FIG. 1. When switch 12 is closed, thus short circuiting control coil 11, most of the flux linking primary coil 14 links load coil 15, allowing full voltage to be applied to load 17. Conversely, if switch 12 is opened, thus open circuiting coil 11, most of the flux linking primary coil 14 links control coil 11. The voltage induced in load coil 16, then, will be nearly zero. Thus, by varying the duty cycle with which switch 12 is opened and closed, the average value of the load coil voltage can be controlled.

If the primary alternating voltage is a square wave, the duty cycle of that voltage does not change during the load voltage controlling action described above. Only the duty cycle of the control coil voltage changes during the regulation action. If ideal switching elements are assumed everywhere in the circuit, then no power is dissipated during this regulating action. This basic circuit, then, has the capability of regulating action while still maintaining high overall circuit power efficiency.

Figure 3:
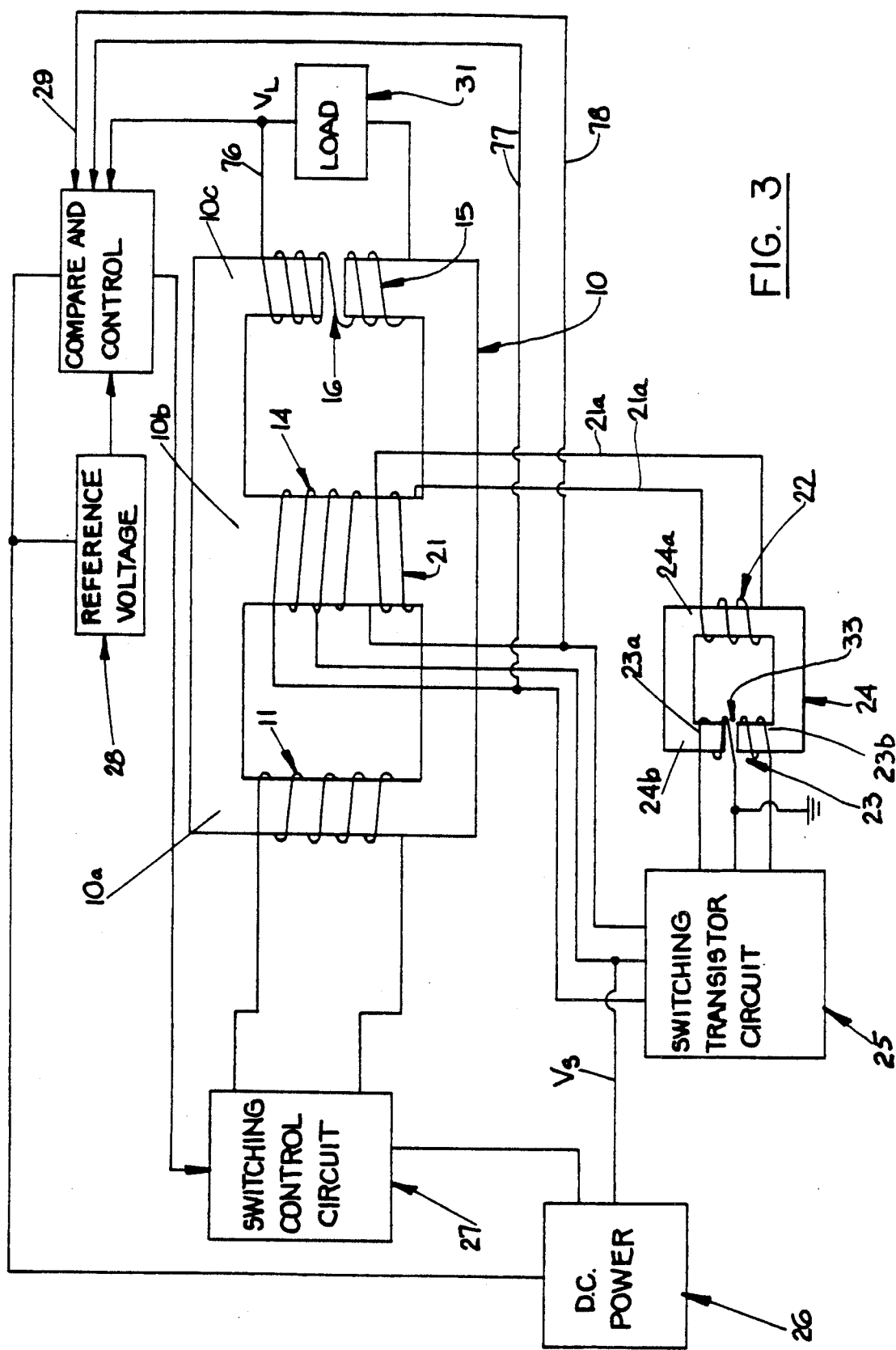
FIG. 3 is a schematic block diagram illustrating a first preferred embodiment of the low noise switching power supply of the present invention wherein a portion of the circuit detail is not shown for clarity.

FIG. 3 illustrates a first preferred embodiment of the subject invention utilizing the type of transformer described hereinabove with respect to FIG. 2 wherein elements similar to those previously described are similarly designated. In FIG. 3, some of the circuit detail is not shown for clarity, but all of the elements needed to realize a complete voltage regulated power supply are shown. As previously described, transformer core 10 incorporates legs 10a, 10b and 10c with associated control coil 11, primary coil 14, and load coil 15, respectively. The alternating voltage that is applied to primary coil 14 is generated in the switching transistor circuit 25, with the aid of feedback. This feedback is derived from a feedback coil 21 associated with transformer leg 10b. Feedback coil 21 is connected via lines 21a to a wound primary coil 22 on leg 24a of coupling transformer core 24. Coil 23 on core 24 then feeds this feedback signal to circuit 25. Leg 24b of coupling transformer 24 is provided with a center-tapped secondary winding 24b in order to produce the symmetrical voltages required by switching transistor circuit 25. Coupling transformer 24 is also provided with an air gap 33, which may have a value of zero (making the transformer leg continuous). It will be understood that this part of the circuit of FIG. 3 forms a feedback square wave oscillator, with the characteristics of the main transformer associated with core 10 chosen so that the core does not magnetically saturate, and the characteristics of the coupling transformer associated with core 24 chosen so that the core magnetically saturates during normal operation. In this way, the operating frequency of the square wave oscillator is determined principally by the coupling transformer associated with core 24.

In operation, DC power is furnished to the oscillating circuit through the center tap 20 of coil 14. In the present embodiment of the invention, a novel variation of the standard feedback square wave oscillator circuit is developed with the use of air gap 33 in core 24. This air gap tilts (or shears) the hysteresis loop of coupling transformer core 24 so that a given current excursion in primary coil 22 produces a flux density excursion in the core that depends on the length of the air gap. For a given choice of core area, coil turns, and coil voltage, the operating frequency of the circuit is inversely proportional to the peak flux density excursion. Therefore, the length of air gap 33 can be used to set the operating frequency of the circuit, which, in turn, when coupled with the high leakage reactance structure of the main transformer associated with core 10, establishes the nominal value of the load output voltage produced by load coil 15. In the present embodiment, these components are chosen to provide an operating frequency of 20 KHz, or greater.

Switching control circuit 27 is used to apply a controlled short circuit to control winding 11. Circuit 27 receives its control signals from compare and control circuit 29, which compares the load voltage at load 31 to a reference voltage 28. If the output voltage varies above or below the desired value for any reason, circuit 29 will cause the duty cycle of the short circuit applied by switching control circuit 27 to control coil 11 to be varied in such a way as to keep the average value of the voltage produced by load coil 15 substantially constant.

In this first embodiment of the present invention, the duty cycle of the voltage produced by switching transistor circuit 25 across primary coil 14 does not change during the regulating action of the power supply. Moreover, the pulses produced by switching transistor circuit 25 on lines 25a can be of relatively long duration, thereby reducing substantially the high frequency content of the electrical pulses on lines 25a and in the remainder of the electrical and magnetic circuit. This minimizes induced noise in the unregulated supply as well as load 31. While narrow control pulses may be generated in switching control circuit 27, these pulses are isolated from DC power supply 26 and load 31 by the leakage reactance of the main transformer associated with core 10. In contrast, prior art switching power supplies that pulse-width modulate the alternating voltage applied to the primary winding (and hence switch substantial current levels) require complex filtering schemes to prevent the appearance of noise pulses on the input or output lines.

It will also be observed that the type of self-oscillating circuit used in connection with the first embodiment of the present invention permits the power supply to start easily with a soft start action and operate down to lower input (brownout) voltages, as opposed to the driven oscillator circuits used in contemporary switching power supplies. In addition, the power supply exhibits low noise operation and excellent voltage regulation with respect to load, line, or temperature variations.

Figure 5:
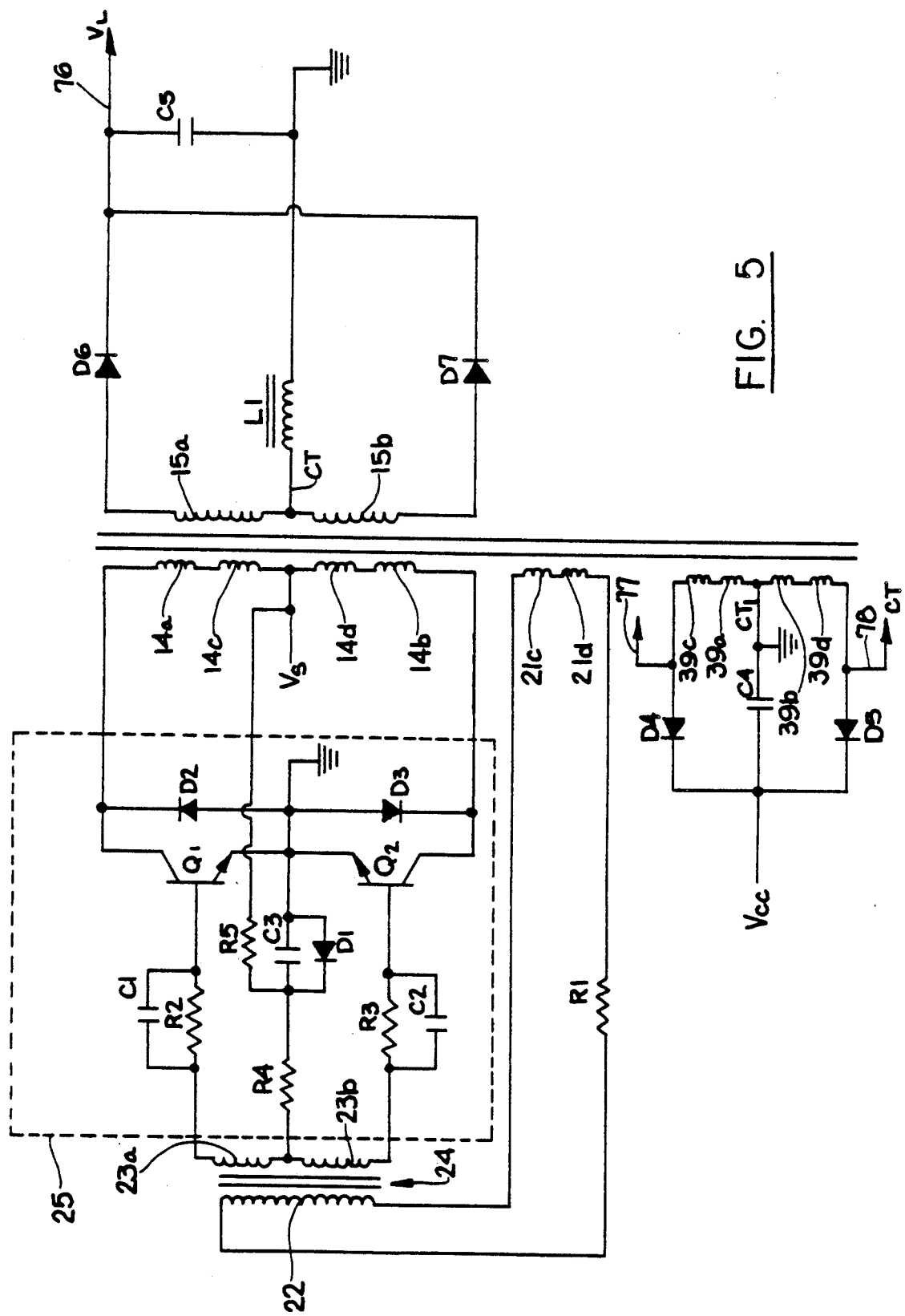
FIG. 5 is a schematic diagram of the switching portion of the first embodiment of the present invention.
Figure 6:
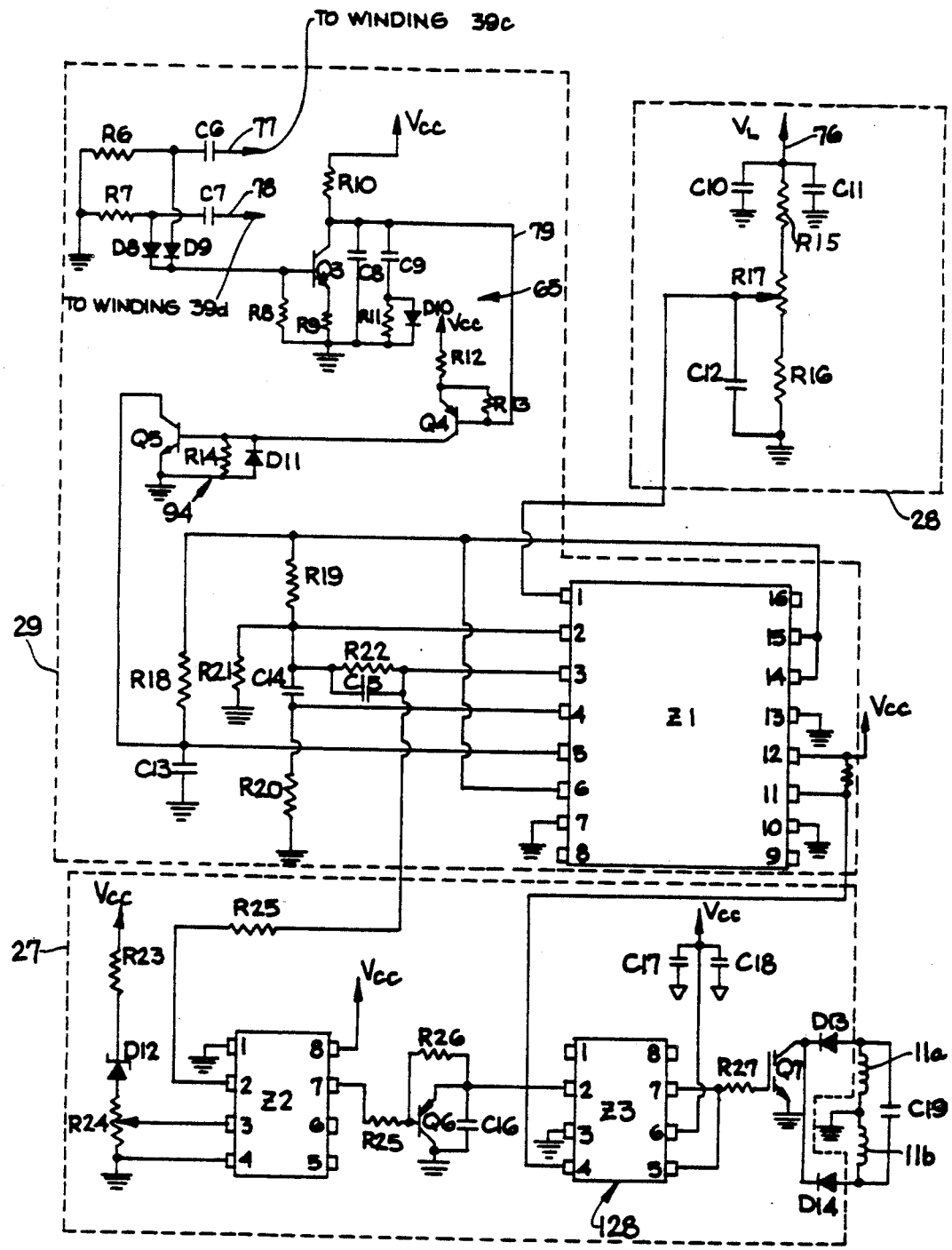
FIG. 6 is a schematic block diagram depicting the control circuit of the first embodiment of the present invention for regulating the voltage connected to the external load.

A complete first preferred embodiment of the present invention is shown in FIGS. 4, 5 and 6, where elements similar to those previously described are similarly designated. FIG. 4 illustrates the modifications which have been made to the main transformer coil winding arrangement in order to control the leakage reactance and reduce interactions between load windings on the main transformer associated with core 10.

In this first embodiment, primary coil 14 is distributed in winding sections 14a-14d in a ratio of 2:1 between legs 10b and 10c of the core, respectively. Winding portions 14a and 14b are positioned on leg 10b and are connected to the respective collectors of switching transistors Q1 and Q2 as will be described in detail hereinafter. Winding portions 14c and 14d are positioned on core leg 10c and form the center tap voltage $V_s$ as will also be described hereinafter.

Feedback coil 21 is also split into two portions 21c and 21d which are wound on transformer core legs 10b and 10c in the ratio of 2:1, respectively. The output of this coil is connected to coupling transformer 24 as will be described hereinafter.

Load coil 15 is split into two parts 15a and 15b in order to form a center tap portion. Both load coil windings are positioned on transformer core leg 10c, and are connected to subsequent DC filters and the power supply load as will be described hereinafter.

In order to provide internal working DC voltages for the power supply of the first embodiment, the main transformer is also provided with an additional winding 39 which is split into four winding portions 39a-39d. Winding portions 39a and 39b are provided on core leg 10b and winding portions 39c and 39d are provided on core leg 10c, in the ratio of 2:1. The output from winding 39 is used to provide the internally utilized DC voltage as will $V_{CC}$ as will be described hereinafter.

In order to minimize the leakage reactance between the primary coil and all other windings on the main transformer, a portion of primary coil windings 14c and 14d may be wound directly over load coil windings 15a and 15b. In addition, it is generally desirable to have a relatively large leakage reactance between control winding 11 and the other windings on the main transformer core in order to minimize noise pulse transmission from the control circuit to other portions of the power supply circuit.

FIG. 5 illustrates schematically the switching portion of the first preferred embodiment of the present invention, with details of the transformer winding configuration shown in FIG. 4 deleted for clarity. As previously described, the main transformer is designed to avoid magnetic saturation during the switching action of the circuit, while core 24 of the coupling transformer is designed to magnetically saturate during the switching action of the circuit. Serially connected resistor R1 provides current limiting to prevent over-saturation of transistors Q1 and Q2.

As seen in FIG. 5, feedback windings 21c and 21d on the main transformer furnish a feedback signal to winding 22 on the feedback switching transformer 24. This signal is coupled to secondary windings 23a and 23b. Winding 23a is connected to the base of transistor Q1 through resistor R2, with parallel capacitor C1 serving as a speed-up capacitor to provide crisp switching action. Similarly, winding 23b is connected to the base of switching transistor Q2 through the parallel combination of resistor R3 and capacitor C2.

The biasing circuit formed by resistors R4 and R5, capacitor C3, and diode D1 are connected between input voltage source $V_s$ and the center tap of windings 23a and 23b to provide a bias that initiates the oscillation of the circuit. Diodes D2 and D3 protect transistors Q1 and Q2, respectively, from damage due to reverse voltage transients. The collectors of transistors Q1 and Q2 are connected, respectively, to primary coil windings 14a and 14b. Capacitor C20 and resistor R30 reduce overshoot in the collector voltages of Q1 and Q2. It will be understood that the circuit elements just described and enclosed within the dashed area shown in FIG. 5 form the switching transistor circuit 25 of FIG. 3.

Windings 39a-39d furnish a square wave voltage to diodes D4 and D5, where it is rectified and then filtered by capacitor C4. This circuit produces voltage $V_{CC}$, which is used to power the control system electronics.

Load windings 15a and 15b furnish a square wave voltage to rectifying diodes D6 and D7, as well as to a filter formed by inductor L1 and capacitor C5. This arrangement produces the output voltage $V_L$ on line 76 which is connected to load 31, as well as compare and control circuit 29 as described below.

The circuitry for switching control circuit 27, reference voltage 28 and compare and control circuit 29 is shown in FIG. 6, where elements previously described are similarly designated. In order to synchronize this circuitry with the oscillations in the main transformer, the square wave voltages from windings 30c and 39d on lines 77 and 78, respectively, are applied to capacitors C6 and C7 and resistors R6 and R7. Diodes D8 and D9 then combine these separate square voltages and apply the composite voltage to the base of transistor Q3, which is biased with resistors R8 and R9 and loaded with collector resistor R10. Capacitors C8 and C9, in conjunction with resistor R11 and diode D10, provide a series of negative-going pulses on line 79 that are synchronized with the oscillations in the main transformer. These pulses are applied to the base of transistor Q4, which, in conjunction with resistors R12, R13 and R14, diode D11, and transistor Q5, produces a positive-going synchronizing pulse at pin 5 of integrated circuit Z1. This integrated circuit, which may be a TL 494 (produced by several manufacturers) is a pulse width modulated control circuit that produces a pulse width modulated signal at pin 11 in response to a voltage level signal applied to the non-inverting error signal input port at pin 1. This error signal input signal is derived from the reference voltage circuit 28 formed by capacitors C10, C11, and C12, resistors R15 and R16, and variable resistor R17. The reference is connected to output load voltage $V_L$. Variable resistor R17 is used to set the level of output load voltage $V_L$ being regulated by controlling the magnitude of the voltage fed to pin 1 of integrated circuit Z1. The error signal amplifier being used in integrated circuit Z1 is frequency compensated by the network consisting of resistors R18-R21, and capacitors C13, C14 and C15. Resistor R22 is used to return the other input of the error amplifier to ground. The actual reference voltage, to which the voltage at pin 1 is being compared, is generated internally in integrated circuit Z1.

Generally, integrated circuit Z1 exhibits a natural offset in its control characteristic in response to a voltage level signal at pin 1. This offset is about 0.8 V, and restricts the ability of the control signal to control the output signal pulse width from zero to its maximum value (one half of the oscillating frequency period). To overcome this shortcoming, circuitry is provided to produce a voltage to counteract the offset voltage. This is provided by integrated circuit Z2 (which may comprise an A 311, produced by several manufacturers), which operates in conjunction with a reference voltage established by voltage $V_{CC}$, fixed resistors R23 and variable resistor R24, and Zener diode D12. Resistor R24 is adjusted to apply about 0.8 V to pin 3 of voltage comparator Z2.

The error amplifier output signal appearing at pin 3 of Z1 is applied to pin 2 of voltage comparator Z2 through resistor R25. If the error amplifier output voltage is greater than the reference voltage established at pin 3 of voltage comparator Z2 (approximately 0.8 volts), then the output voltage at pin 7 of voltage comparator Z2 will be a higher level, thus cutting off driver transistor Q6.

Conversely, if the error amplifier output voltage at pin 3 of integrated circuit Z1 falls below the reference voltage at pin 3 of voltage comparator Z2 (approximately 0.8 volts) the voltage output at pin 7 of voltage comparator Z2 will become almost zero, causing transistor Q6 to turn on. Resistors R25 and R26 bias transistor Q6, while capacitor C16 suppresses transients in that circuit.

The output from transistor Q6 is connected to input pin 2 of integrated circuit Z3 which is a dual power MOSFET driver. Integrated circuit Z3 may be an ICL 7667 manufactured by GE/Intersil. When transistor Q6 turns on to drive input pin 2 of Z3 low, output pin 7 of circuit Z3 assumes a high level. Conversely, when transistor Q6 turns off, pin 7 of circuit Z3 assumes a low level.

The pulse width modulated output from integrated circuit Z1 appearing at pin 11 is connected to MOSFET driver input pin 4 of integrated circuit Z3. The driver output appears at pin 5, and is wired with the driver output from pin 7. This combined output is connected through resistor R27 to the gate of driver transistor Q7.

Consequently, transistor Q7, a so-called COMFET device, will be turned on only when a pulse is produced by pulse width modulator circuit Z1 and the necessary offset threshold voltage has been exceeded as determined by the circuitry associated with integrated circuit Z2 as previously described.

The output of transistor Q7 is connected through diodes D13 and D14, respectively, to windings 11a and 11b of control winding 11. The diodes insure that unidirectional current flow will occur through transistor Q7 regardless of the polarity of the voltage induced in windings 11a and 11b. Capacitor C19 reduces high frequency spiking.

When transistor Q7 is conducting, control winding 11 will be shorted, thereby providing full output voltage to load winding 15. Conversely, when transistor Q7 is not conducting, control winding 11 is open-circuited and the voltage induced in load winding 15 will be reduced to nearly zero. Thus, by controlling the duty cycle of transistor Q7 as previously described, the value of the output load voltage $V_L$ may be precisely controlled.

In operation, upon application of primary power to the power supply, switching transistor circuit 25 begins oscillating via the feedback loop through primary coil 14, feedback coil 21 and the feedback transformer associated with transformer core 24. The frequency of oscillation is determined by the electronic element characteristics as previously described.

This oscillation induces a magnetic flux in main transformer coil 10, which causes an output load voltage $V_L$ to be produced from load coil 15 on output line 76. The magnitude of the output load voltage is sensed by compare and control circuit 29 and compared with the reference voltage established by reference voltage circuit 28.

If the output load voltage $V_L$ is lower than the desired output voltage as established by variable resistor R17 associated with the reference voltage circuit 28, the duty cycle of the switching voltage applied to switching control circuit 27 is adjusted by compare and control circuit 29 so as to increase the amount of time that control coil 11 is short circuited. This action causes more magnetic flux to flow in leg 10c of the main transformer winding, thereby increasing the average value of the output voltage $V_L$.

Conversely, if the output load voltage is higher than desired as determined by the setting of variable resistor R17, compare and control circuit 29 adjusts the duty cycle of the switching voltage applied to switching control circuit 27 so that control coil 11 is short circuited for a smaller percentage of the time. This causes less flux to flow in leg 10c for the main transformer core, thereby decreasing the average value of the output load voltage $V_L$.

In the situation where the output voltage is the exact value desired, the duty cycle of the switching voltage applied to switching control circuit 27 is maintained constant in order to maintain the output voltage constant.

It will be observed that during this regulating action, the pulse width (and frequency spectrum) of the switching waveforms of transistors Q1 and Q2 associated with switching transistor circuit 25 is not varied. Therefore, relatively little high frequency noise, compared to conventional switching power supplies, is transmitted to the load or input voltage source. Moreover, the relatively loose coupling between feedback winding 21 and the other windings prevents the noise associated with narrow pulses in that winding from being transmitted elsewhere in the circuit. Therefore, no extra noise suppression filtering is required in the circuit of the present invention.

It will also be observed that only two adjustments are required: resistor R17 must be set for the precise value of output load voltage $V_L$ required and resistor R24 must be set to eliminate the effect of the specific value of the offset voltage of integrated circuit Z1.

In tests, the power supply of the present invention has produced line/load regulation of 0.2% over a load variation from 20% of full load to full load and an input voltage variation of rated input voltage ±10%.

The constant frequency operation of the second embodiment of the present invention, which is explained in detail below, is achieved with a separate clock source to sustain oscillations like that in the first embodiment. As a result, the frequency of operation of the power supply is independent of the load conditions. This enables the design of the power supply and its components to be optimized around the stable design frequency. In addition, the clock can be electronically disconnected until all of the control circuits in the power supply are operating. Accordingly, the main switching transistors do not begin operation until all of the regulating circuitry is active and operating, which causes the start-up cycle of the power supply to be more stable and predictable.

Figure 7:
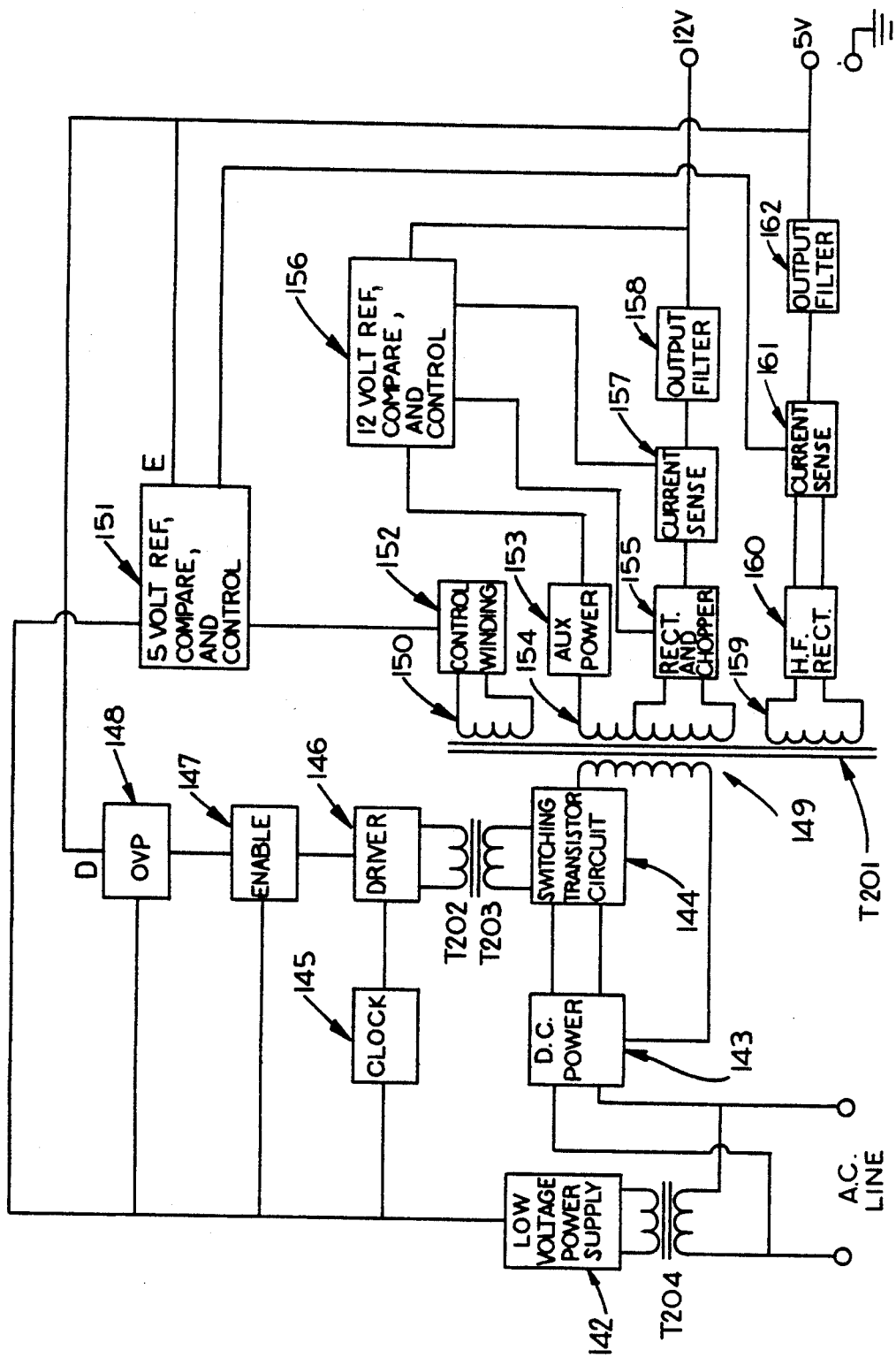
FIG. 7 is a schematic block diagram illustrating a second preferred embodiment of the low noise switching power supply of the present invention wherein a portion of the circuit detail is not shown for clarity.
Figure 15:
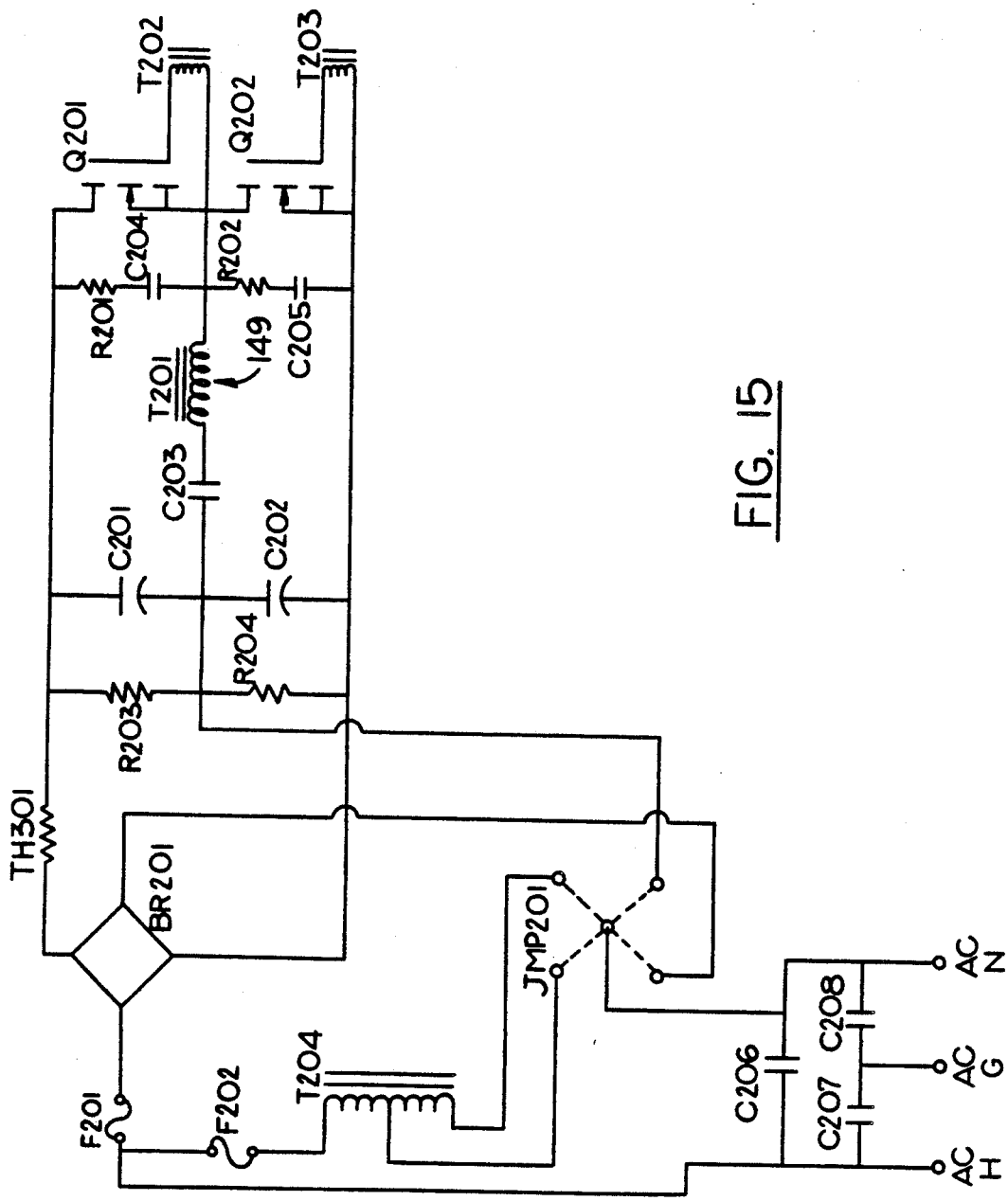
FIG. 15 a is schematic diagram of the input power supply circuitry for the second embodiment of the switching power supply.

As illustrated in the schematic block diagram of FIG. 7, a transformer T204 furnishes an alternating voltage to a low voltage supply circuit 142 in order to provide the required voltage to those elements in the switching power supply that perform certain control functions. A D.C. power supply 143 then furnishes the power to main switching transformer T201 through a switching transistor circuit 144. Transformer T201 has the same structure as the main switching transformer 10 of FIG. 3 described above except that no feedback windings to switching transistors Q201 and Q202 (depicted in FIG. 15, which details switching transistor circuit 144) and no air gap 16 are utilized. Switching transistor circuit 144 is driven by a driver 146 which is controlled by a clock 145 through driver 146. Driver 146 is coupled to switching transistors Q201 and Q202 of switching transistor circuit 144 by means of transformers T202 and T203 (as best seen in FIG. 15, but shown in FIG. 7 as one transformer). In this way, the switching frequency received by transformer T201 is independent of the load on the switching power supply and depends only on the frequency of clock 145 (which is preferably 25 kiloHertz). Driver 146 will not oscillate, however, until it receives an enable signal from enable circuit 147. This ensures that main transformer T201 will not begin operating until the control electronics (i.e., clock 145, enable circuit 147, over voltage protection circuit 148, and compare and control circuits 151 and 156) are powered up by low voltage power supply 142 and operating properly.

Main transformer T201 is of the type described previously herein and regulates the voltage output from load winding 159 through the action of control winding 150 and control winding circuit 152. Control winding circuit 152 alternately shorts control winding 150 in response to signals from compare and control circuit 151. Specifically, compare and control circuit 151 samples the 5 Volt output of the switching power supply, compares it to an internal 5 Volt reference, and controls the time duration of the short on control winding 150 to maintain the output of the switching power supply at 5

Volts regardless of line or load conditions. The output of load winding 159 is rectified by a high frequency power rectifier 160 and is subsequently filtered by output filter 162 to produce the 5 Volt output. Current sense circuit 161 develops a signal to command compare and control circuit 151 to reduce the 5 Volt If the 5 Volt output exceeds its rated value, over voltage protection circuit 148 will interrupt the enable signal produced by enable circuit 147, causing driver 146 to cease operating. This will automatically shut down the switching power supply until the cause of the over voltage is repaired.

Primary winding 154 furnishes power to compare and control circuit 156 through a rectifying and filtering auxiliary power circuit 153 for the 12 Volt output of the system. The 12 Volt output is regulated, as in conventional switching power supplies, independent of the 5 Volt output. The 12 Volt output furnishes a relatively low amount of power to its load compared to that of the 5 Volt output. Compare and control circuit 156 controls the action of rectifier and chopper 155 to produce an output that is filtered by output filter 158. A current sense circuit 157 produces a signal that commands compare and control circuit 156 to reduce the 12 Volt output if its load current exceeds a rated value. Over voltage protection like that provided to the 5 Volt output may optionally be included for use with the 12 Volt output, but the supply is usually allowed to continue operating to ensure that the bias and control circuits of equipment connected to the switching power supply will continue operating.

The resulting switching power supply therefore furnishes two output voltages, 5 Volts and 12 Volts, and is protected against over voltage and over current. The two outputs operate independently of one another, whereby a failure in one output will not disturb the other output. Moreover, because this embodiment of the switching power supply is not self-oscillating, the switching frequency of the switching power supply is constant under rated line and load conditions, thereby easing noise radiation problems, transformer design requirements, and rectification requirements.

Figure 8:
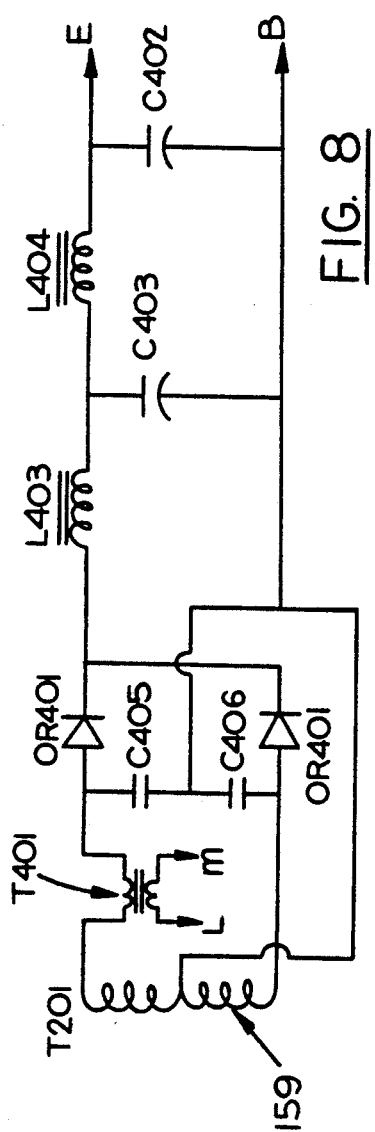
FIG. 8 is a schematic diagram of the circuitry associated with the load winding of the main transformer of FIG. 7 with respect to the 5 volt output circuit.

FIG. 8 shows in greater detail the circuitry associated with load winding 159 of main transformer T201 with respect to the 5 Volt output circuit. A toroidal transformer T401 is provided which samples the current in load winding 159 and produces a signal for over current sensing. Diodes OR401 and OR402, capacitors C405, C406, C402, and C403, and inductors L403 and L404 form rectifying and output filtering circuits 160 and 162 for the 5 Volt output. Outputs E and B are input into compare and control circuit 151.

Figure 9:
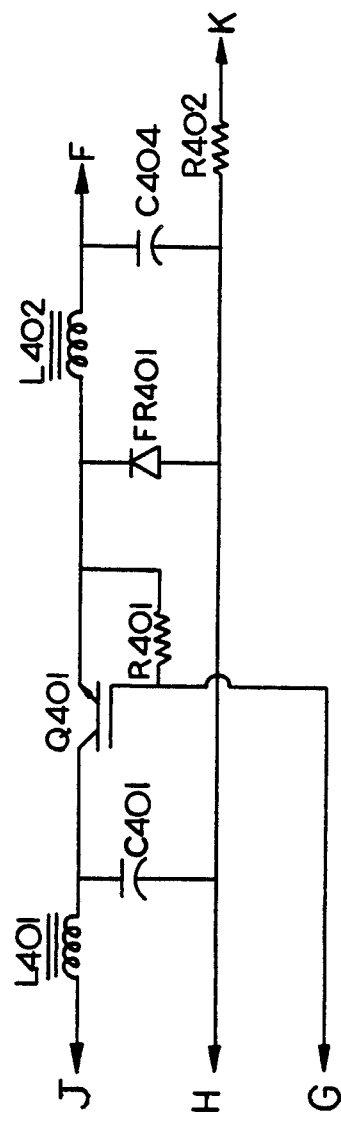
FIG. 9 is a schematic diagram of the circuitry associated with the 12 volt output circuit of the power supply in FIG. 7.

FIG. 9 shows the circuitry associated with the 12 Volt output circuit. Inductors L401 and L402, along with capacitors C401 and C404, form output filter 158 for the 12 Volt output. Transistor Q401, an N-channel enhancement mode conductivity-modulated power field effect transistor (COMFET), is used as a switch to regulate the 12 Volt output. Resistor R401 is used to bias transistor Q401, which is controlled by signals from compare and control circuit 156 (input G). Diode FR401 is used as a freewheeling diode to Prevent output filter circuit 158 from producing high voltage spikes during the switching action of transistor Q401.

FIG. 10 illustrates compare and control circuit 151. A pulse width modulator IC102 (e.g. a TL 494) in the form of an integrated circuit produces an output in response to input signals from control winding circuit 152 (at input E). Its output (pin 11), in turn, drives a low output impedance/high output current driver IC103 (pins 2 and 4 of an ICL 7667 by GE/Intersil), which produces the signals that short control winding 150 on main transformer T201. The 5 Volt output is sampled at input E of compare and control circuit 151 and is conditioned through the network consisting of capacitors C108 and C109 and resistors R119, R115 and R116. A potentiometer P102 allows the output of the sampling-/conditioning network to be adjusted before it is applied to pulse width modulator IC102 at pins 2 and 4. Potentiometer P102 is then used to make fine adjustments of the 5 Volt output. If the 5 Volt output varies for any reason, the duty cycle of pulse width modulator IC102 is modified to counteract the variance. Further, the width (in time) of the short circuit on control winding 150 is affected in response to the feedback from the 5 Volt output through compare and control unit 151. To lower the 5 Volt output, the time width of the short circuit is decreased. By the same token, the time width of the short circuit is increased in order to raise the 5 Volt output.

Input C of compare and control circuit 151 is derived from switching transistor circuit 144. That input is delayed with respect to the switching signals and is applied to a network consisting of resistors R120 and R121, capacitor C111, and transistor Q101. The outputs of that network are applied to pulse width modulator IC102 at pins 5, 6, 14 and 15 to delay its output so that driver IC103 will not cause control winding 150 to be shorted unless main switching transistors Q201 and Q202 in switching transistor circuit 144 are both turned off. This delay in switching transistor circuit 144 produces a "dead band" between the active periods of switching transistors Q201 and Q202, which reduces spiking in control winding 150 and protects diodes CR501 and CR502 of FIG. 13.

Figure 11:
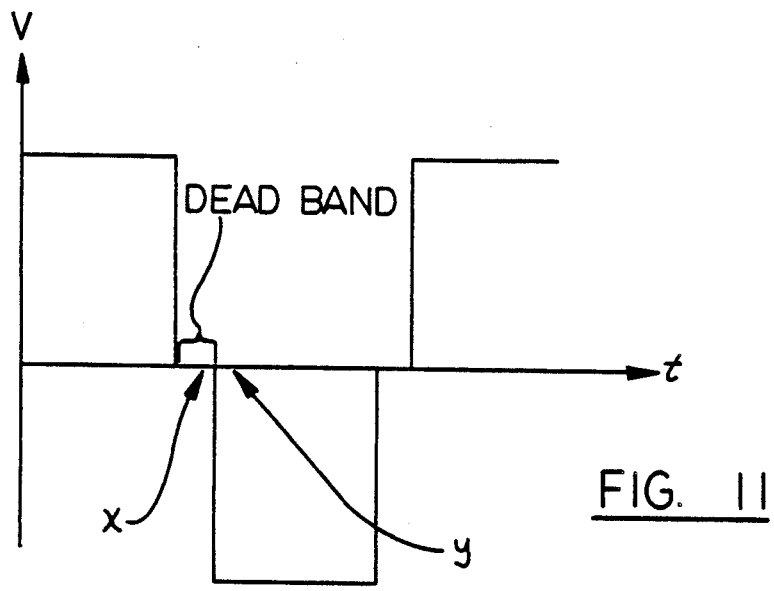
FIG. 11 is a graph, in volts versus time, which depicts the dead band between the active switching periods of the switching transistors in the power supply of the second embodiment.

As shown in the Volts versus Time graph in FIG. 11, the delay circuitry in switching transistor circuit 144 produces a dead band (of approximately 5 microseconds) between the active switching periods of switching transistors Q201 and Q202. The initiation of the short circuit on control winding 150 occurs during this dead band (e.g., at x), but the short circuit is removed during the on-period of one of switching transistors Q201 and Q202 (such as at y). As a result, only a relatively short (in time) dead band is needed in the switching waveform.

FIG. 12 illustrates in greater detail compare and control circuit 156 for the 12 Volt output. Input K of compare and control circuit 156 is derived from primary winding 154 of main transformer T201 and is rectified and filtered by diode D101 and capacitors C101 and C102 to furnish the supply voltage for pulse width modulator IC101 (preferably a TL 494). The 12 Volt output is sampled and applied to input F, which is conditioned by a network consisting of resistors R101 and R102, and potentiometer P101. Potentiometer P101 is used to make fine adjustments of the 12 Volt output. The resultant signal from the network changes the duty cycle of pulse width modulator IC101 (through a connection at pin 1), which in turn controls the duty cycle of transistor Q401 (input G shown in FIG. 9) through resistors R103 and R104. Consequently, control of the duty cycle for transistor Q401 regulates the 12 Volt output of the switching power supply. Input H of compare and control circuit 156 is derived from a current sensing resistor R402 (shown in FIG. 9). The signal stemming therefrom is factored by resistors R106 and R105, which will reduce the voltage at the 12 Volt output if the rated current of that output is exceeded.

Figure 13:
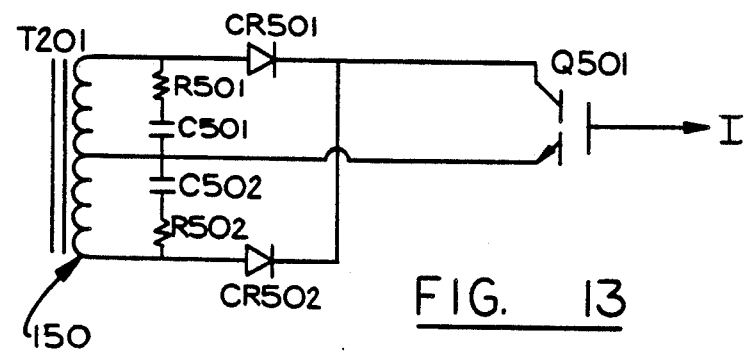
FIG. 13 is a schematic diagram of the shorting circuitry associated with the control winding of the main transformer in the second embodiment of the present invention.

FIG. 13 depicts the shorting circuit 152 associated with control winding 150 of main transformer T201. Input I of control winding circuit 152 is derived from output driver IC103 of compare and control circuit 151. Transistor Q501 is switched during the dead band of main switching transistors Q201 and Q202 in switching transistor circuit 144. Diodes CR501 and CR502 are provided to rectify the output of control winding 150 so that the current through transistor Q501 is unidirectional. Resistors R501 and R502, in connection with capacitors C501 and C502, form a snubber network to minimize spiking in control winding 150.

Figure 14:
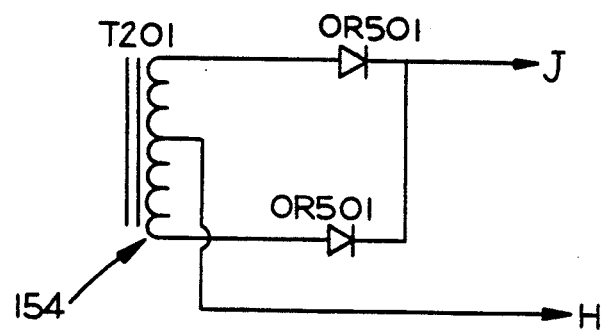
FIG. 14 is a schematic diagram depicting the circuitry associated with the primary winding of the main transformer in the second embodiment of the present invention.

FIG. 14 depicts the circuitry associated with primary winding 154 on main transformer T201. Point H is a center tap of primary winding 154 wherein diodes OR501 are supplied. Diodes OR501 furnish a unidirectional voltage to the drain of transistor Q401 through output J (input J shown in FIG. 9), which is the switching transistor that regulates the 12 Volt output.

FIG. 15 depicts the input power supply circuitry for the switching power supply of this embodiment. The AC line voltage is furnished through a jumper switch JMP201 to the primary winding of transformer T204. The position of jumper switch JMP201 selects either a 120 Volt or 240 Volt input. A protective fuse F201 is provided for rectifier assembly BR201 and a fuse F202 is utilized to protect transformer T204. Rectifier assembly BR201 is a full-wave bridge rectifier which, in combination with resistors R203 and R204 and capacitors C201 and C202, forms the main DC power supply 143 for the switching power supply. Capacitor C203 blocks DC current from primary winding 149 of main transformer T201. Main field effect switching transistors Q201 and Q202 of switching transistor circuit 144 are driven by transformers T202 and T203. Resistors R201 and R202 and capacitors C204 and C205 form a spike suppression network for switching transistors Q201 and Q202. Capacitors C206, C207 and C208 form a noise suppression network at the AC input to help prevent line spikes.

Figure 16:
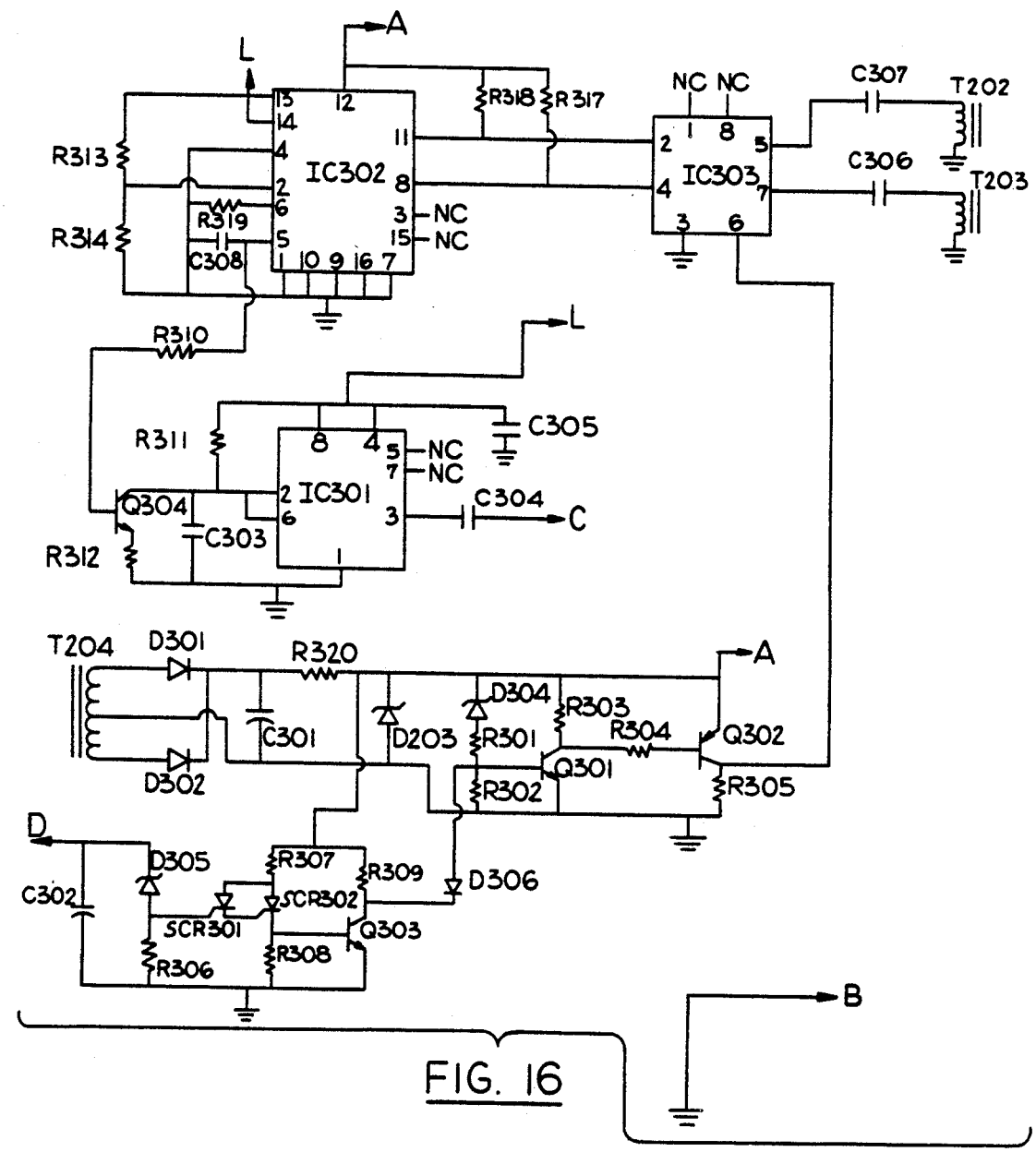
FIG. 16 is a schematic block diagram of the start-up, over voltage protection, clock, and dead band generation circuitry of the power supply of FIG. 7.

FIG. 16 illustrates the start-up, over voltage protection, clock, and dead band generation circuitry of the switching power supply. Clock 145 for the switching power supply is comprised of integrated circuit IC302 (a TL 494). Resistors R313, R314 and R319 and capacitor C308 bias clock 145 for operation at the selected frequency. Resistors R317 and R318 provide a square wave input to driver 146 (IC303 an ICL 7667), which then drives transformers T202 and T203 through de-coupling capacitors C306 and C307. A timer integrated circuit IC301 (a TL 555 made by many manufacturers) is used to develop the delay signal for switching of control winding 150. An output signal from clock 145 (pin 5 of IC302), through resistor R310, turns off transistor Q304 and permits timer integrated circuit IC301 to cycle. Resistor R312 biases transistor Q304. Resistor R311 and capacitor C303 determine the cycle time of clock 145, and correspondingly when the delayed output pulse at output C (which is input to compare and control circuit 151) appears. A de-coupling capacitor C304 and a bypass capacitor C305 are also provided. As described previously, the output pulse at output C determines when control winding 150 is shorted. In this case, the short is chosen to occur when switching transistors Q201 and Q202 are both turned off (not conducting current). Input D in FIG. 16 is taken from the 5 Volt output of the switching power supply. If the voltage exceeds its rated value for any reason, silicon controlled rectifiers SCR301 and SCR302 will fire and turn on transistor Q303. This will cause transistors Q301 and Q302 to turn off, which disables driver 146 (pin 6 of IC303) and shuts down the switching power supply until it is restarted with manual intervention. Over voltage protection circuit 148 ensures that the power supply will shut down if the 5 volt output rises above a specified value for any reason. Zener diode D305 establishes the shut down voltage in conjunction with resistor R306. Resistors R307, R308 and R309 (shown in FIG. 16) properly bias the circuitry. Capacitor C302 serves as a noise filter and diode D306 de-couples over voltage protection circuit 148 during normal operation of the switching power supply. The secondary voltage of transformer T204 is also rectified and filtered by diode D301, D302 and capacitor C301. Zener diode D303 and resistor R320 regulate the output of low voltage power supply 142.

The initiation of the start-up is accomplished by utilizing enable circuit 147 in conjunction with driver 146 (IC303). Zener diode D304, in conjunction with resistors R301 and R302, delays the turn on of transistors Q301 and Q302 until the voltage at A is high enough to operate the control circuitry throughout the switching power supply. When transistor Q302 turns on driver 146 (IC303 at pin 6), it is enabled to drive main switching transistors Q201 and Q202 through transformers T202 and T203. Resistors R303, R304 and R305 properly bias transistors Q301 and Q302.

Accordingly, this embodiment of the switching power supply has a constant frequency which features a sequenced turn-on operation with little noise. Further, over voltage and over current protection are provided to protect the switching power supply.

What is claimed is:

1. A low noise switching power supply for producing a regulated output voltage from an unregulated supply to a load, comprising:
   (a) a transformer including:
      i. a transformer core including first, second and third core legs;
      ii. a set of transformer windings associated with said transformer including:
         a. a control winding associated with said first core leg;
         b. a primary winding associated with said second core leg; and
         c. a load winding associated with said third core leg for producing said output voltage; and
   (b) control means for controlling said output voltage comprising:
      i. switching means responsive to said unregulated supply for providing an oscillating voltage of substantially constant frequency to said primary winding;
      ii. means for comparing the actual output voltage produced at said load winding with a reference representative of the desired output voltage value to produce an error signal representative of the difference between said actual output voltage and said reference; and
      iii. means responsive to said error signal for short circuiting said control winding as required to maintain said output voltage at said desired value.

2. A constant frequency switching power supply for producing a regulated output voltage from an unregulated supply to a load, comprising:
(a) a transformer including:
  i. a transformer core including first, second and third core legs; and
  ii. a set of transformer windings associated with said transformer including:
    a. a control winding associated with said first core leg;
    b. a primary winding associated with said second core leg; and
    c. a load winding associated with said third core leg; and
(b) control means for controlling said output voltage comprising:
  i. a constant frequency source applied to a pair of switching transistors in said unregulated supply for providing an oscillating voltage of substantially constant frequency to said primary winding independent of the load winding;
  ii. means for comparing the actual output voltage produced at said load winding with a reference representative of the desired output voltage value to produce an error signal representative of the difference between said actual output voltage and said reference; and
  iii. means responsive to said error signal for short circuiting said control winding as required to maintain said output voltage at said desired value.

3. The constant frequency switching power supply of claim 2, wherein said short circuiting means short circuits said control winding when the switching transistors of said unregulated supply are not conducting current, the flux in the transformer being changed while the unregulated supply is not providing said oscillating voltage.

4. The constant frequency power supply of claim 3, wherein said short circuiting means discontinues short circuiting of said control winding when one of the switching transistors of said unregulated supply is conducting current.

5. The constant frequency switching power supply of claim 4, including a dead band between the conduction and nonconduction a current in the switching transistors of said unregulated supply.

6. The constant frequency switching power supply of claim 5, said short circuiting means initiating short circuiting of said control winding during the dead band and removing said short circuiting when one of the switching transistors resumes conducting current.

7. The constant frequency switching power supply of claim 2, said constant frequency source further comprising:
(a) a clock having a specified frequency; and
(b) means for driving the switching transistors of said unregulated supply, said driving means being controlled by said clock.

8. The constant frequency switching power supply of claim 7, including a means for enabling said driving means to oscillate only when the control means are powered up and operating properly.

9. The constant frequency switching power supply of claim 8, including an over voltage protection means which interrupts the enabling means and causes the driving means to cease operating when the output voltage of the supply exceeds its rated value.

10. The constant frequency switching power supply of claim 2, including a means for determining current at the load winding and signaling the control means to reduce the output voltage of the supply when the rated value of the load current is exceeded.

11. The constant frequency switching power supply of claim 2, said regulated output voltage being substantially five volts or twelve volts.

* * * * *

UNITED STATES PATENT AND TRADEMARK OFFICE
CERTIFICATE OF CORRECTION

PATENT NO. : 4,994,952

DATED : February 19, 1991

INVENTOR(S) : Donald M. Silva, LeRoy F. Silva and Fred M. Fehsenfeld, Sr.

It is certified that error appears in the above-identified patent and that said Letters Patent is hereby corrected as shown below:

```
Claim 5 - Line 8 - Column 18 - "a" should be replaced by --
of --.
```

Signed and Sealed this

Twenty-third Day of June, 1992

*Attest:*

DOUGLAS B. COMER

*Attesting Officer*    *Acting Commissioner of Patents and Trademarks*